United States Patent [19]

Muench et al.

[11] Patent Number: 4,632,946

[45] Date of Patent: Dec. 30, 1986

[54] HALOGEN-FREE FLAMEPROOFED THERMOPLASTIC MOLDING MATERIAL

[75] Inventors: Volker Muench, Ludwigshafen; Juergen Hambrecht, Heidelberg; Adolf Echte, Ludwigshafen; Karl H. Illers, Otterstadt; Johann Swoboda, Ludwigshafen, all of Fed. Rep. of Germany

[73] Assignee: BASF Aktiengesellschaft, Ludwigshafen, Fed. Rep. of Germany

[21] Appl. No.: 692,620

[22] Filed: Jan. 18, 1985

[30] Foreign Application Priority Data

Jan. 20, 1984 [DE] Fed. Rep. of Germany ....... 3401835

[51] Int. Cl.$^4$ .......... C09K 21/14; C08K 5/16; C08K 5/52; C08L 61/06

[52] U.S. Cl. .......... 523/179; 524/20; 524/50; 524/100; 524/129; 524/154; 524/509; 524/510; 524/511; 514/130; 514/133; 514/139; 514/145; 525/68; 525/131; 525/134; 525/136; 525/138; 525/141; 525/145; 525/440; 525/442; 525/456; 528/72

[58] Field of Search .......... 523/179; 524/100, 50, 524/509, 511, 510, 20, 154, 139, 145, 133, 130, 129; 528/72; 525/68, 456, 131, 134, 136, 138, 141, 145, 440, 442

[56] References Cited

U.S. PATENT DOCUMENTS

| | | | |
|---|---|---|---|
| 2,473,319 | 6/1949 | Winkelmann | 524/509 |
| 2,635,976 | 4/1953 | Meiler et al. | 524/509 |
| 3,061,900 | 11/1962 | Montgomery et al. | 525/134 |
| 3,098,057 | 7/1963 | Baum | 524/509 |
| 3,124,551 | 3/1964 | Warren | 524/509 |
| 3,313,651 | 4/1967 | Burns | 525/138 |
| 3,554,934 | 1/1971 | Ingram | 525/134 |
| 3,816,562 | 6/1974 | Holoch et al. | 525/136 |
| 3,883,613 | 5/1975 | Cooper | 525/136 |
| 3,930,104 | 12/1975 | MacKenzie et al. | 525/138 |
| 3,931,101 | 1/1976 | Dany et al. | 524/80 |
| 4,094,834 | 6/1978 | Bowers et al. | 525/509 |
| 4,105,825 | 8/1978 | Heath et al. | 524/511 |
| 4,107,103 | 8/1978 | Hubner et al. | 521/165 |
| 4,170,508 | 10/1979 | Wortmann et al. | 524/409 |
| 4,198,492 | 4/1980 | Izawa et al. | 525/134 |
| 4,268,633 | 5/1981 | Fearing | 521/168 |
| 4,328,139 | 5/1982 | Simons | 524/495 |
| 4,332,714 | 6/1982 | Haaf et al. | 525/68 |
| 4,338,412 | 7/1982 | Bonin | 528/72 |
| 4,367,295 | 1/1983 | Bonin | 528/72 |
| 4,380,593 | 4/1983 | Bonin et al. | 528/72 |
| 4,385,140 | 5/1983 | Wagner et al. | 524/100 |
| 4,397,974 | 8/1983 | Goyert et al. | 524/140 |
| 4,465,807 | 8/1984 | Giller et al. | 524/134 |
| 4,468,495 | 8/1984 | Pearson | 525/456 |
| 4,504,613 | 3/1985 | Abolins et al. | 525/68 |
| 4,542,186 | 9/1985 | Giller et al. | 524/511 |

FOREIGN PATENT DOCUMENTS

| | | | |
|---|---|---|---|
| 1433781 | 4/1976 | United Kingdom | 524/510 |
| 2054610 | 2/1981 | United Kingdom | |

*Primary Examiner*—Herbert J. Lilling
*Attorney, Agent, or Firm*—Keil & Weinkauf

[57] ABSTRACT

A halogen-free flameproofed thermoplastic molding material consists of a halogen-free thermoplastic resin (A) and one or more further halogen-free components.

The thermoplastic resin (A) is present in an amount of from 30 to 90% by weight, based on the molding material. The latter contains, as further components, from 1 to 50% by weight of a phenol/aldehyde resin (B), from 1 to 50% by weight of a nitrogen-containing organic compound (C) and from 3 to 50% by weight of a phosphorus-containing organic compound (D), the percentages in each case being based on the molding material.

The molding material is used for the production of flameproofed moldings.

10 Claims, No Drawings

HALOGEN-FREE FLAMEPROOFED THERMOPLASTIC MOLDING MATERIAL

The present invention relates to a halogen-free flameproofed thermoplastic molding material which consists of a halogen-free thermoplastic resin and other halogen-free flameproofing components.

The relevant prior art includes the following standard publications on the flameproofing of thermoplastics:

(1) Vogel, Flammfestmachen von Kunststoffen, Hüthig Verlag, Heidelberg (1966), pages 94–102,
(2) Troitzsch, Brandverhalten von Kunststoffen, Hanser Verlag, Munich (1982), pages 1–65, and
(3) Hirschler, Developments in Polymer Stabilization, Volume 5, Editor G. Scott, Applied Science Publishers, London (1982), pages 107–151.

The flameproofing of thermoplastics has been disclosed in (1), (2) and (3). It is also known that when relatively large amounts of halogen-containing flameproofing agents are used and at the same time synergistic agents such as compounds of phosphorus, arsenic, antimony, bismuth, boron or tin are employed, thermoplastics do not drip flaming particles and are self-extinguishing after application of a hot flame. It is furthermore known that, if a synergistic agent is not used, this self-extinguishing effect occurs only after the addition of a far larger amount of halogen-containing flameproofing agents.

In addition to the abovementioned possibility of treating thermoplastics with halogen-containing flameproofing agents, it is also possible to use a halogen-free flameproofing agent. For example, blends of poly-(2,6-dimethyl-1,4-phenylene) ether (PPE) and high impact polystyrene (HIPS) can be flameproofed by means of phosphorus-containing organic compounds. From 50 to 60% by weight, based on HIPS, of PPE and phosphorus compounds are added (cf. for example German Laid-Open Applications DOS 3,019,617 and DOS 3,002,792). It has also been disclosed that styrene polymers can be flameproofed with very large amounts (from 40 to 50% by weight) of $Mg(OH)_2$ (cf. European Patent 52,868), polyguanamines (cf. German Laid-Open Application DOS 2,837,378) or phosphinic acidmelamine adduct/dicyanodiamide/red phosphorus systems (cf. German Laid-Open Application DOS 2,827,867) or novolak/red phosphorus systems (cf. E.N. Peters, A.B. Furtek, D.I. Steinbert and D.T. Kwiatkowski, Journal of Fire Retardant Chemistry, 7 (1980), 69–71). It has also been disclosed that styrene polymers can be treated with intumescent flameproofing systems, such as poly(ammonium phosphate) and a resin based on tris(2-hydroxyethyl) isocyanurate (cf. European Pat. Nos. 26,391 and 45,835), on 2,6,7-trioxa-1-phosphabicyclo[2.2.2]octane-4-methanol 1-oxide/melamine (cf. European Patent 69,500) or on bis(2-hydroxyethyl) phosphate/melamine/dipentaerythritol (cf. U.S. Pat. No. 4,247,435), and with melammonium pentaerythritol diphosphate (cf. British Patent No. 2,028,822). However, in the British patent cited, it is pointed out that the conventional systems have only a moderate effect in styrene polymers. Finally, British Patent 2,054,610 states that phenol/formaldehyde resins are not very effective for flameproofing thermoplastics.

The use of halogen-free flameproofing agents, as described above, has not to date resulted in any striking improvement, as is evident from extensive series of tests. For example, a large number of thermoplastics have to be treated with large amounts of flameproofing agents, or a particular flameproofing system is effective in certain thermoplastics but not at all in others. Furthermore, certain components of these systems result in an excessive increase in the flow and a drastic reduction in the heat distortion resistance. Virtually all halogen-free flameproofing systems are completely incompatible with the thermoplastics to be treated and lead to a deterioration in the mechanical properties; in general, the molding materials treated with halogen-free flameproofing agents drip the particles on application of a flame.

It is an object of the present invention to provide a halogen-free flameproofing system which is free of the above disadvantages. Furthermore, the said flameproofing system, even when used in thermoplastics which to date could be flameproofed with halogen-free flameproofing agents only with great difficulty, if at all, should permit these thermoplastics to be classified UL 94 V 1 and UL 94 VO.

In addition, the halogen-free flameproofing system should prevent molding materials from dripping flaming or non-flaming particles when a flame is applied.

We have found that this object is achieved by a halogen-free flameproofed thermoplastic molding material, consisting of one or more halogen-free thermoplastic resins (A) and one or more further halogen-free components, wherein the thermoplastic resin (A) is present in an amount of from 30 to 90% by weight, and the said molding material contains, as further components, (B) from 1 to 50% by weight of one or more phenol-/aldehyde resins, (C) from 1 to 50% by weight of one or more nitrogen-containing organic compounds and (D) from 3 to 50% by weight of one or more phosphorus-containing organic compounds, the percentages in each case being based on the molding material consisting of A+B+C+D.

The composition of the novel molding material in terms of the components, and the preparation of these, are described below.

The molding material consists of components A, B, C and D, i.e. the sum of the amounts of these 4 components is 100%. Each of the components A, B, C and D is known per se. It is the proposal to use the components B+C+D as an intumescent system in conjunction with thermoplastic resins (A) in order to obtain halogen-free flameproofed molding materials which is novel and inventive.

The molding material according to the invention consists of 1. from 5 to 95, in particular from 30 to 90, preferably from 65 to 75, % by weight of component A,
2. from 1 to 50, in particular from 5 to 25, preferably from 8 to 12, % by weight of component B,
3. from 1 to 50, in particular from 5 to 25, preferably from 8 to 12, % by weight of component C and
4. from 3 to 50, in particular from 5 to 25, preferably from 8 to 12, % by weight of component D.

Preferably, the components B, C and D which constitute the halogen-free flameproofing system are used in equal amounts. The amounts of the above components A, B, C and D are based in each case on the molding material consisting of A +B +C +D (=100%).

Component A

Component A of the novel molding material comprises one or more commercial halogen-free thermoplastic resins which may or may not have been toughened. These resins can be a homopolymer or copolymer of a thermoplastic. Blends of various thermoplastics which are listed below can also be used. Suitable thermoplastics are polyethylene, polypropylene, polyisobutylene, polystyrene and copolymers of styrene with acrylonitrile, with maleic anhydride, with maleates and with acrylates, which may or may not have been toughened with rubber. Copolymers of acrylonitrile with α(methylstyrene, which may have been toughened with rubber, are also useful, and other suitable thermoplastics are nylons, polyesters, polyurethanes, poly(oxyalkylenes), polycarbonates and poly(methyl methacrylate).

Homopolymers A1

Preferably used homopolymers are polystyrenes ($A_1$), and some or all of the styrene component can be replaced by styrene which is alkylated in the nucleus, eg. p-methylstyrene, in order to improve the heat distortion resistance. Copolymers $A_2$.

Copolymers of styrene with acrylonitrile ($A_2$), with maleic anhydride, with maleates and with acrylates are particularly preferably used.

From amongst these copolymers, styrene/acrylonitrile copolymers ($A_2$) are very particularly preferably used for the preparation of the novel molding material; these styrene/acrylonitrile copolymers consist of from 1 to 50% by weight of acrylonitrile ($a_2$) and from 50 to 99% by weight of styrene ($a_1$). In order to improve the heat distortion resistance, some or all of the styrene component can be replaced with styrene which is alkylated in the nucleus. Styrene/acrylonitrile copolymers ($A_2$) are available commercially and can be prepared, for example, as described in German Published Application DAS 1,001,001 or German Patent No. 1,003,436. The copolymers can have a molecular weight $\overline{M}_w$ of from $10^5$ to $2.5 \times 10^5$ (weight average molecular weight from light scattering).

The elastomer used for toughening the component A of the novel molding material can be an ungrafted rubber ($a_3$) or a grafted rubber ($a_4$).

The rubber ($a_3$) should have a glass transition temperature (according to K. H. Illers and H. Breuer, Kolloid Zeitschrift 176 (1961), 110) of less than 0° C. Examples of suitable rubbers are polybutadiene (cf. German Laid-Open Applications DOS 1,420,775 and DOS 1,495,089), copolymers of butadiene and styrene (cf. British Patent 649,166), copolymers of butadiene and styrene, polyacrylates which may or may not be crosslinked (cf. German Laid-Open Application DOS 1,138,921 and German Published Application DAS 1,224,486 or DAS 1,260,135), copolymers of acrylates and butadiene (cf. German Published Application DAS 1,238,207), and elastomers of copolymers of acrylates with styrene, acrylonitrile and vinyl ethers and copolymers of ethylene and a non-conjugated diene (EPDM rubbers).

For toughening homopolymers (HIPS), it is particularly preferable to use polybutadiene ($a_3$), in amounts of from 2 to 20, preferably from 3 to 10, % by weight, based on component $A_1$.

To prepare particularly impact-resistant copolymers $A_2$, grafted rubbers are required, preferably those based on polybutadiene ($a_4$). Suitable rubbers of this type are graft copolymers, which can be used in amounts of from 5 to 50, in particular from 10 to 45, % by weight, based on the component $A_2$.

These graft copolymers consist of from 10 to 50, preferably from 15 to 45, % by weight of a mixture of one or more vinylaromatic monomers ($a_1$) of not more than 12 carbon atoms and from 0.1 to 25, preferably from 5 to 20, % by weight of one or more (meth)acrylates and/or acrylonitrile ($a_2$) as a grafted shell on from 50 to 90, in particular from 50 to 75, % by weight of an elastomeric grafting base (rubber component ($a_3$)) which, if required, can be crosslinked. The vinylaromatic graft monomers ($a_1$) are styrene, α-methylstyrene and/or styrenes of not more than 12 carbon atoms which are alkylated in the nucleus; suitable monomers ($a_2$) are (meth)acrylates of alkanols of not more than 8 carbon atoms, and acrylonitrile and mixtures of these.

The preparation of the graft copolymers ($a_4$) is known per se. They can be prepared by, for example, polymerization of a mixture of styrene and acrylonitrile and/or (meth)acrylates in the presence of a rubber.

Suitable graft rubbers ($a_4$) are:

$a_{4a}$: 75% of polybutadiene rubber grafted with 25% of styrene/acrylonitrile in a ratio of 90:10, $a_{4b}$: 75% of polybutadiene rubber grafted with 25% of styrene/acrylonitrile in a ratio of 83:17, $a_{4c}$: 75% of polybutadiene rubber grafted with 25% of styrene/acrylonitrile in a ratio of 75:25, $a_{4d}$: 75% of polybutadiene rubber grafted with 25% of styrene/acrylonitrile in a ratio of 70:30, $a_{4e}$: 75% of a rubber consisting of 60 parts of butyl acrylate and 40 parts of butadiene, grafted with 25% of styrene/acrylonitrile in a ratio of 70:30, $a_{4f}$: 75% of polybutadiene rubber grafted with 25% of styrene/acrylonitrile in a ratio of 65:35, $a_{4g}$: 60% of polybutadiene rubber grafted with 40% of styrene/acrylonitrile in a ratio of 65:35, $a_{4h}$: 60% of a rubber consisting of butyl acrylate and dicyclopentadienyl acrylate in a ratio of 98:2, grafted with 40% of styrene/acrylonitrile in a ratio of 75:25, and $a_{4i}$: 75% of a rubber consisting of butyl acrylate, buta-1,3-diene and vinyl methyl ether in a ratio of 57:38.4:4.5, grafted with 25% of styrene/acrylonitrile in a ratio of 70:30. $a_{4g}$ is particularly preferably used.

Mixtures of component $A_1$ or $A_2$ and rubbers $a_3$ or $a_4$ which are particularly preferably used in the novel molding materials are accordingly high impact polystyrene ($A_3$), impact-resistant styrene/acrylonitrile copolymers ($A_4$) and acrylonitrile/butadiene/styrene graft copolymers (ABS); ($A_5$).

Component B

Components B of the novel molding material are phenol/aldehyde resins which, as is known, can be prepared by condensation of phenols and aldehydes. Novolaks having a number average molecular weight $\overline{MHD}$ n of from 500 to 2,000 are particularly preferably used.

Their preparation is described in, for example, Houben-Weyl, Methoden der organischen Chemie, Volume 14, Part 2, Georg Thieme Verlag, Stuttgart, 1963, page 201 et seq., or in Sorensen and Campbell, Preparative Methods of Polymer Chemistry, Interscience Publishers, New York, 1968, and the thermodynamic properties of novolak/polymer blends are described by Fahrenholtz and Kwei in Macromolecules, 14 (1981), 1076–1079.

Novolaks can be prepared using aldehydes (b₁) of the general formula (I)

$$R^1\text{-CHO} \qquad (I)$$

where $R^1$ is H, $C_1$–$C_{10}$-alkyl, cycloalkyl, $C_6$–$C_{12}$-aryl or ω-aryl-$C_1$–$C_3$-alkyl. Examples are formaldehyde, acetaldehyde, n-propanal, n-butanal, isopropanal, isobutyraldehyde, 3-methyl-n-butanal, benzaldehyde, p-tolylaldehyde and 2-phenylacetaldehyde, and other compounds which can also be used include furfurylaldehyde. Formaldehyde is particularly preferably employed.

Suitable phenols (b₂) are those of the general formula (II)

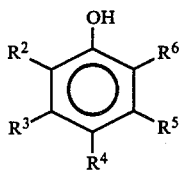

where $R^2$ and $R^6$ are each hydrogen, and $R^3$, $R^4$ and $R^5$ can each alternatively be hydrogen, $C_1$–$C_{20}$-alkyl, cycloalkyl, $C_6$–$C_{10}$-aryl, $C_1$–$C_6$-alkoxy, cycloalkoxy, $C_6$–$C_{10}$-phenoxy, hydroxyl, carbonyl, carboxyl, cyano, a $C_1$–$C_6$-alkyl ester radical, a $C_6$–$C_{10}$-aryl ester radical, sulfo, sulfonamido, a sulfonic acid $C_1$–$C_6$-alkyl ester radical, a sulfonic acid $C_6$–$C_{10}$-aryl ester radical, a $C_1$–$C_6$-alkyl- or $C_6$–$C_{10}$-arylphosphinic acid radical or its $C_1$–$C_6$-alkyl or $C_6$–$C_{10}$-aryl ester radical, a phosphonic acid radical or its mono- or di-$C_1$–$C_6$-alkyl or -$C_6$–$C_{10}$-aryl ester, an 0-phosphoric acid radical or its mono- or di-$C_1$–$C_6$-alkyl or -$C_6$–$C_{10}$-aryl ester, or ω-aryl-$C_1$–$C_6$-alkyl, or $R^2$ and $R^4$ are each hydrogen, and $R^3$, $R^5$ and $R^6$ can have the above meanings.

Without imposing any restrictions, typical examples of (b₂) are phenol, o-cresol, m-cresol, p-cresol, 2,5-dimethyl-, 3,5-dimethyl-, 2,3,5-trimethyl-, 3,4,5-trimethyl-, p-tert.-butyl-, p-n-octyl-, p-stearyl-, p-phenyl-, p-(2-phenylethyl)-, o-isopropyl-, p-isopropyl-, m-isopropyl-, p-methoxy- and p-phenoxyphenol, pyrocatechol, resorcinol, hydroquinone, salicylaldehyde, salicylic acid, p-hydroxybenzoic acid, methyl p-hydroxybenzoate, p-cyano- and o-cyanophenol, p-hydroxybenzenesulfonic acid, p-hydroxybenzenesulfonamide, cyclohexyl p-hydroxybenzenesulfonate, 4-hydroxyphenylphenylphosphinic acid, methyl 4-hydroxyphenylphenylphosphinate, 4-hydroxyphenylphosphonic acid, ethyl 4-hydroxyphenylphosphonate and diphenyl 4-hydroxyphenylphosphonate and a large number of other phenols. Phenol, o-cresol, m-cresol, p-cresol, p-tert.-butylphenol, o-tert.-butylphenol and p-octylphenol are preferably used.

However, mixtures of these phenols can also be employed.

Without imposing any restriction, preferably used novolaks (B) are accordingly
B₁: phenol/formaldehyde novolak,
B₂: o-cresol/formaldehyde novolak,
B₃: m-cresol/formaldehyde novolak,
B₄: t-butylphenol/formaldehyde novolak,
B₅: p-octylphenol/formaldehyde novolak and
B₆: p-cyanophenol/formaldehyde novolak.

B₅ is particularly preferably used.

Examples of preferably employed novolaks consisting of mixtures of phenols (b₂) are listed in Table 1. This list is not intended to imply any restriction.

The composition of the mixtures of phenols is not critical and can vary within the stated limits. In calculating a composition, the following applies:

$$\epsilon\text{mol \%} = 100$$

TABLE 1

| | Examples of preferably used phenol mixtures | | | | |
|---|---|---|---|---|---|
| Name | Secondary components / Main component | o-Cresol (mol %) | m-Cresol (mol %) | p-Cresol (mol %) | p-tert.-Butylphenol (mol %) | o-tert.-Butylphenol (mol %) |
| B₇ | phenol | (10–40) | — | — | (2–15) | — |
| B₈ | phenol | (10–20) | (30–40) | — | — | (5–10) |
| B₉ | phenol | (10–40) | (15–20) | — | (2–10) | (1–3) |
| B₁₀ | o-cresol | — | (35–45) | — | — | — |
| B₁₁ | o-cresol | — | (5–30) | — | (5–30) | — |
| B₁₂ | o-cresol | — | — | — | — | (5–40) |
| B₁₃ | o-cresol | — | (15–20) | — | (10–20) | — |
| B₁₄ | o-cresol | — | (15–25) | — | (5–15) | (2–10) |
| B₁₅ | o-cresol | — | (5–30) | (5–30) | — | — |

B₁₁ and B₁₅ are preferably used. Mixtures which are very particularly preferably used in formaldehyde novolaks are B₁₁ and B₁₅ of the composition: from 60 to 70 mol % of o-cresol+from 15 to 20 mol % of m-cresol+from 10 to 20 mol % of p-tert.-butylphenol or p-cresol.

Component C

Component C of the novel molding material is a nitrogen-containing organic compound from the group consisting of the triazines, triazolidines, ureas, guanidines, guanamines, aminoacids and peptides and their salts and derivatives. Triazine derivatives are preferably employed, melamine (C₁) being particularly preferred.

Component D

Component D of the novel molding material is a phosphorus-containing organic compound from the group consisting of the phosphines, phosphine oxides, phosphinous acids, phosphites, phosphonic acids, phosphates, phosphinamides, phosphonamides, phosphoramides, hypophosphites and hypodiphosphates. Cyclic and dicyclic phosphites, phosphonates, phosphates, hypophosphites and hypodiphosphates, eg. methyl neopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentylhypophosphite, phenyl pyrocatechol phosphite, ethyl pyrocatechol phosphate or dipyrocatechol hypodiphosphate, are preferably employed. However, oligomeric pentaerythritol phosphites, phosphates and phosphonates of the general formulae (III), (IV) and (V), as described in European Patent No. 8,486, can also be used:

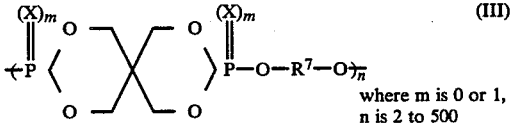

where m is 0 or 1, n is 2 to 500

-continued

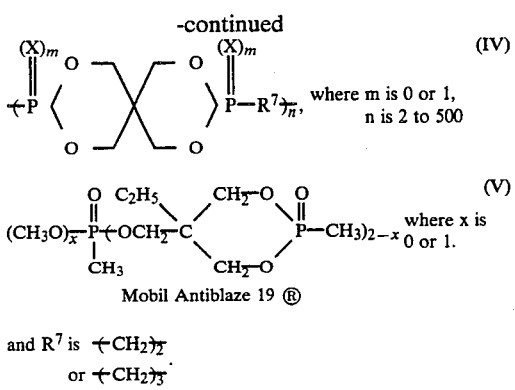

Mobil Antiblaze 19 ® and $R^7$ is $-(CH_2)_2-$
or $-(CH_2)_3-$

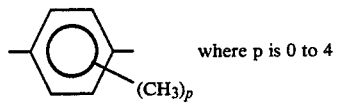
where p is 0 to 4

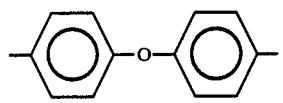

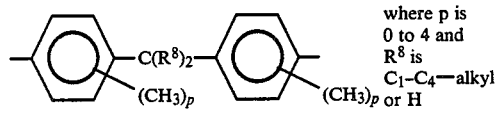
where p is 0 to 4 and $R^8$ is $C_1-C_4$—alkyl

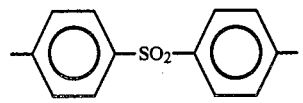

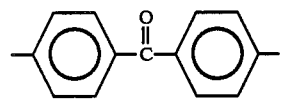

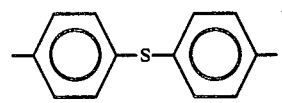

In all of the formulae above, n can be an integer from 2 to 500, preferably from 10 to 250, X is oxygen or sulfur, and x is 0 or 1. It is also possible to use halogen-free reaction products of $PCL_{13}$ or $POCl_3$ with mixtures of polyfunctional alcohols, such as glycol, glycerol, 1,2,3,4-tetrahydroxybutane and other monofunctional alcohols and phenols.

Methyl neopentyl phosphonate ($D_1$), phenyl neopentyl phosphonate ($D_2$), pentaerythritol diphenyl diphosphate ($D_3$) and Antiblaze 19$^{(R)}$ from Mobil ($D_4$) are particularly preferably used.

Component E

The molding materials according to the invention can, if required, contain conventional additives. Suitable additives are known and well-tried stabilizers, such as sterically hindered phenols and organic phosphites, each of which is used in a conventional amount of from 0.01 to 0.5% by weight, based on the molding material consisting of A, B, C and D. Sulfur and/or sulfur-containing stabilizers, such as dithiocarbamate complexes, salts of xanthogenic acid, thiazoles and zinc salts of mercaptobenzimidazoles can also be used, each of these being employed in a conventional amount of from 0.01 to 0.5% by weight, based on the total mixture.

It is also possible to use fillers, colored pigments, lubricants, plasticizers, antistatic agents, blowing agents or other metal-free synergistic agents, such as triphenyl phosphate or triphenyl phosphine oxide, in conventional amounts familiar to the skilled worker. The novel flame-retardant material and any additives used can be incorporated by a suitable conventional mixing method, for example in an extruder, kneader or roll mill.

In particular, a masterbatch of the components B, C and D of the novel flame-retardant material can be prepared in the form of powders or in the form of a powdered mixture in the (desired) thermoplastic (component A) and this is then incorporated into a further part of the thermoplastic in order to achieve the intended composition.

The molding materials according to the invention can be processed by injection molding or extrudation to give self-extinguishing moldings or profiles.

In addition to being self-extinguishing, the novel molding materials possess good heat distortion resistance and good flow and do not drip particles after a flame has been applied.

The molding material is distinguished in particular by the fact that even styrene polymers and copolymers and toughened styrene polymers and copolymers can be flameproofed with feasible amounts of halogen-free components. The fact that the system B+C+D gives rise to a flame-retardant effect in all the thermoplastics is surprising because conventional flame-retardant systems have no effect in the stated thermoplastics, and in particular the individual components B, C and D of the novel molding material do not have any flame-retardant effect at all even when added in amounts which are prohibitively high in practice.

The fire tests stated in the Examples and Comparative Experiments are carried out as follows:

The flammability test is carried out as a vertical burning test according to the recommendations of the Underwriter's Laboratories, in order to classify the materials in one of the fire classes 94 VO, 94 VI or 94 V2.

A flameproofed thermoplastic is classified UL 94 VO when the following criteria are satisfied: in a set of 5 samples measuring 127×12.7×3.16 mm, none of the samples must burn with flaming combustion for longer than 10 seconds after a 19 mm high open flame has been applied twice for 10 seconds. The total flaming combustion time for 10 applications of the flame to 5 samples must not exceed 50 seconds. There must not be any dripping of flaming particles, complete combustion or subsequent glowing combustion which persists for more than 30 seconds. Classification as UL 94 V1 requires that the flaming combustion times are no longer than 30 seconds and that the total glaming combustion time for 10 applications of the flame to 5 samples does not exceed 250 seconds. Subsequent flowing combustion must never exceed 60 seconds. The other criteria are identical to those stated above. Classification as UL 94 V2 is appropriate when the criteria for classification as UL 94 V1 are satisfied, with the exception that dripping of flaming particles takes place.

To carry out the experiments, the substances described below were prepared, or were available for use.

Component A (the abbreviation stated in Table 2 is given at the end, eg. product A1=SAN-1)

1. styrene/acrylonitrile copolymer (SAN) containing 25% by weight of acrylonitrile and having an intrinsic viscosity IV of 101 (all intrinsic viscosity data are based on values measured in 0.5% strength solution in dimethylformamide at 25° C.) (=SAN-1);
2. SAN containing 35% of acrylonitrile and having an intrinsic viscosity of 104 (=SAN-2);
3. SAN containing 35% of acrylonitrile and having an intrinsic viscosity of 80 (=SAN-3);
4. polybutadiene rubber (60%) grafted with 40% of styrene/acrylonitrile in a ratio of 65:35 ($a_{4g}$)=PB 900;
5. toughened SAN-3 containing 45% of PB 900 (=ABS-45); and
6. toughened SAN-3 containing 20% of PB 900 (=ABS-20).

Component B (abbreviation in Table 2 in ( ), eg. ($B_{11}$))
Mixed novolak ($B_{11}$)

11.34 kg of o-cresol, 2.754 kg of m-cresol, 2,925 kg of p-tert.-butylphenol, 5,392 kg of formalin (37% strength in water), 314 g of oxalic acid . $2H_2O$ and 540 g of $CH_3OH$ are mixed together in 30 l of water, and stirring is continued for 24 hours at from 95° to 97° C. After 24 hours, the upper, aqueous phase is siphoned off, and the lower phase is washed with 10 l of water. The lower, product-containing phase is discharged, and the solvents and some of the readily volatile phenols are stripped off under reduced pressure from a water pump. The melt which remains is freed from residual phenol at 150° C. and under from 0.2 to 0.4 mbar. The melt is cooled on a metal sheet, and is then comminuted and milled.

Yield: 10.3 kg
Analysis: C 80.0%, H 4.7%, 0 13.3%
Molecular weight (determined by vapor pressure osmometry in acetone): 700.

Mixed novolak ($B_{15}$)

The novolak ($B_{15}$) is prepared by a similar method, from 63.18 kg of p-cresol, 82.62 kg of m-cresol, 340.2 kg of o-cresol and 320.4 kg of formalin (40% strength in water) with the addition of 10 kg of oxalic acid and 35 kg of $CH_3OH$.

Yield: 400 kg
Molecular weight (determined by vapor pressure osmometry in acetone): 1,000.

Component C

Melamine ($C_1$) (commercial product).

Component D

1. Methyl neopentyl phosphonate ($D_1$) 104 g (1 mole) of neopentylglycol and 200 g (2.5 moles) of pyridine in 500 ml of dioxane are initially taken, and a solution of 133 g (1 mole) of methylphosphonyl dichloride in 100 ml of dioxane is added dropwise at 30° C. The mixture is refluxed for 2 hours and then cooled, precipitated pyridinium hydrochloride is filtered off, and the filtrate is evaporated down under reduced pressure from a water pump, first at 80° C. and then at 120° C. The crude product is washed with diethyl ether and recrystallized from ethyl acetate.

2. Phenyl neopentyl phosphonate ($D_2$)

The compound is prepared from 104 g (1 mole) of neopentylglycol, 200 g (2.5 moles) of pyridine and 145 g (1 mole) of phenylphosphonyl dichloride in dioxane, the method used being similar to that employed for methyl neopentyl phosphonate, but differing from the above preparation in that the product is washed with water and recrystallized from methylcyclohexane.

Yield: 182 g of phenyl neopentyl diphosphonate of melting point 109°–111° C.

3. Pentaerythritol diphenyl phosphate ($D_3$)

136 g of pentaerythritol are introduced into 500 ml of $POCl_3$ via a metering powder funnel, and the mixture is heated to 100° C. The alcohol dissolves in the course of from 30 to 45 minutes, HCl being evolved. Pentaerythritol diphosphorchloridate then begins to crystallize out. The major part of the $POCl_3$ is distilled off under reduced pressure, and the remaining crystals are washed with methylene chloride. The ester chloride (250 g) and 220 g of phenol are refluxed together with 200 ml of triethylamine in 2 l of methylene chloride. The methylene chloride is distilled off, and the residue is extracted with a mixture of water and methylene chloride. The methylene chloride solution is separated off, dried and evaporated down.

Yield: 288 g (70%).

4. Antiblaze 19(R) from Mobil (commercial product; $D_4$)

The following substances were employed for comparison:

1. Xylene/formaldehyde resin (XFR)

To carry out comparative experiments, the low-oxygen xylene/formaldehyde resin described in U.S. Pat. No. 4,082,728 and having an oxygen content of <1% by weight is prepared from xylene and paraformaldehyde in the presence of concentrated $H_2SO_4$. As shown by investigations by nuclear resonance spectroscopy, the polymer contained exclusively methylene bridges and no dimethyl ether bridges (—$CH_2$—O—$CH_2$—).

Analysis: 0.4% of O
Molecular weight (determined by vapor pressure osmometry in toluene): 1,100.

2. Poly(ammonium phosphate) (Exolith(R) from Hoechst, or Phoschek(R) P/30 from Monsanto) according to European Patent No. 26,391.

3. Bis(2-hydroxyethyl) phosphate according to German Laid-Open Application DOS 2,928,349.

4. Melamine phosphate according to European Patent 69,500.

5. Dimelammonium pentaerythritol diphosphate+tripentaerythritol (Weston XP 1668 test product from Borg Warner, according to British Patent No. 2,028,822).

The Examples and Comparative Experiments which follow illustrate the invention. Parts and percentages are based on the weight of the particular mixture, unless stated otherwise.

EXAMPLES 1 TO 14 AND COMPARATIVE EXPERIMENTS 15 TO 38

The amounts, stated in Table 2 in % by weight, of components of the novel material and, where relevant, of further additives were mixed at 40° C. in a fluid mixer from Henschel, Kassel. The mixture of these components was then melted together with thermoplastic resins or toughened thermoplastic resins, in the amounts stated in Table 2, in an extruder at 230° C., and the melt was homogenized and then granulated.

TABLE 2

Examples and Comparative Experiments

| | Components A (% by weight) | B (% by weight) | C (% by weight) | D (% by weight) | B + C + D (% by weight) | Classification according to UL 94 | Dripping non-flaming particles | Dripping flaming particles |
|---|---|---|---|---|---|---|---|---|
| Example No. (according to the invention) | | | | | | | | |
| 1 | SAN-1 76 | $B_{11}$ 8 | $C_1$ 8 | $D_1$ 8 | 24 | V1 | no | no |
| 2 | SAN-1 73 | $B_{11}$ 9 | $C_1$ 9 | $D_1$ 9 | 27 | V0 | no | no |
| 3 | SAN-2 76 | $B_{11}$ 8 | $C_1$ 8 | $D_1$ 8 | 24 | V0 | no | no |
| 4 | SAN-3 76 | $B_{11}$ 8 | $C_1$ 8 | $D_1$ 8 | 24 | V0 | no | no |
| 5 | SAN-3 65 | $B_{11}$ 15 | $C_1$ 10 | $D_4$ 10 | 35 | V0 | no | no |
| 6 | ABS-20 77,5 | $B_{11}$ 7.5 | $C_1$ 7.5 | $D_1$ 7.5 | 22,5 | V1 | no | no |
| 7 | ABS-20 73 | $B_{11}$ 9 | $C_1$ 9 | $D_1$ 9 | 27 | V0 | no | no |
| 8 | ABS-20 70 | $B_{11}$ 10 | $C_1$ 10 | $D_2$ 10 | 30 | V1 | no | no |
| 9 | ABS-20 72 | $B_{11}$ 10 | $C_1$ 9 | $D_3$ 9 | 28 | V0 | no | no |
| 10 | ABS-20 72 | $B_{15}$ 10 | $C_1$ 9 | $D_1$ 9 | 28 | V0 | no | no |
| 11 | ABS-20 70 | $B_{15}$ 10 | $C_1$ 10 | $D_2$ 10 | 30 | V0 | no | no |
| 12 | ABS-45 72 | $B_{11}$ 9 | $C_1$ 10 | $D_1$ 9 | 28 | V0 | no | no |
| 13 | ABS-45 71 | $B_{11}$ 10 | $C_1$ 9 | $D_3$ 10 | 29 | V0 | no | no |
| 14 | ABS-45 68 | $B_{15}$ 12 | $C_1$ 10 | $D_1$ 10 | 32 | V0 | no | no |
| Comparative Experiments (not according to the invention) | | | | | | | | |
| 15 | SAN-1 60 | $B_{11}$ 40 | — | — | 40 | no | yes | yes |
| 16 | SAN-1 60 | — | — | $D_1$ 40 | 40 | no | no | yes |
| 17 | ABS-20 50 | $B_{11}$ 50 | — | — | 50 | no | no | no |
| 18 | ABS-20 60 | — | $C_1$ 40 | — | 40 | no | yes | yes |
| 19 | ABS-20 60 | — | — | $D_1$ 40 | 40 | no | no | yes |
| 20 | ABS-20 60 | $B_{11}$ 20 | $C_1$ 20 | — | 40 | no | no | no |
| 21 | ABS-20 60 | $B_{11}$ 20 | — | $D_1$ 20 | 40 | no | no | yes |
| 22 | ABS-20 60 | — | $C_1$ 20 | $D_1$ 20 | 40 | no | no | yes |
| 23 | ABS-20 60 | — | — | $D_2$ 40 | 40 | no | yes | yes |
| 24 | ABS-45 55 | — | — | $D_4$ 45 | 45 | no | yes | yes |
| 25 | ABS-45 60 | — | $C_1$ 16 | bis(hydroxy-ethyl)phosphate 24 | 40 | no | no | no |
| 26 | ABS-20 55 | $B_{11}$ 10 | — | melamine phosphate 35 | 45 | no | no | no |
| 27 | ABS-20 60 | $B_{11}$ 20 | — | Exolith 20 | 40 | no | no | no |
| 28 | ABS-20 60 | $B_{11}$ 20 | $C_1$ 10 | Exolith 10 | 40 | no | no | no |
| 29 | ABS-20 60 | $B_{11}$ 20 | $C_1$ 10 | Phoscheck P/30 10 | 40 | no | no | no |
| 30 | ABS-20 60 | — | — | Weston XP 1668 40 | 40 | no | no | yes |
| 31 | ABS-45 60 | — | — | Weston XP 1668 40 | 40 | no | no | no |
| 32 | ABS-20 70 | $B_{11}$ 10 | — | Weston XP 1668 20 | 30 | no | no | no |
| 33 | SAN-3 60 | — | — | XFR 40 | 40 | no | no | yes |
| 34 | SAN-3 | $B_{11}$ | $C_1$ | XFR | 30 | V2 | no | yes |

TABLE 2-continued

| | | Components | | | | | Dripping | |
|---|---|---|---|---|---|---|---|---|
| | A (% by weight) | B (% by weight) | C (% by weight) | D (% by weight) | B + C + D (% by weight) | Classification according to UL 94 | non-flaming particles | flaming particles |
| 35 | ABS-20 60 | 10 | 10 | 10 XFR 40 | 40 | no | no | yes |
| 36 | ABS-20 70 | B$_{11}$ 10 | C$_1$ 10 | XFR 10 | 30 | no | no | yes |
| 37 | ABS-45 60 | — | — | — | 40 | no | no | yes |
| 38 | ABS-45 70 | B$_{11}$ 10 | C$_1$ 10 | XFR 10 | 30 | no | no | yes |

We claim:

1. A halogen-free flameproofed thermoplastic molding material, comprising one or more halogen-free thermoplastic resins of homopolymers of styrene or copolymers of styrene and acrylonitrile in which some of the styrene component can be replaced by alkylated styrene (A) and one or more further halogen-free components wherein the thermoplastic resin
   (A) is present in an amount of from 30 to 90% by weight, and the said molding material contains, as further components,
   (B) from 1 to 50% by weight of one or more phenol-/aldehyde resins,
   (C) from 1 to 50% by weight of one or more nitrogen-containing organic compounds selected from the group consisting of the triazines, triazolidines, ureas, guanidines, guanamines, aminoacids, peptides their derivatives and salts thereof, and
   (D) from 3 to 50% by weight of one or more phosphorus-containing organic compounds selected from the group consisting of the phosphines, phosphine oxides, phosphinous acids, phosphinic acids, phosphates, hypophosphires, hypodiphosphates and amides of phosphinic acid, of phosphonic acid and of phosphoric acid, the percentages in each case being based on the molding material consisting of A+B+C+D.

2. A thermoplastic molding material as claimed in claim 1, wherein the thermoplastic resin
   (A) is present in an amount of from 30 to 90% by weight, and the said molding material contains, as further components,
   (B) from 5 to 25% by weight of one or more phenol-/aldehyde resins,
   (C) from 5 to 35% by weight of one or more nitrogen-containing organic compounds and
   (D) from 5 to 35% by weight of one or more phosphorus-containing organic compounds, the percentages in each case being based on the molding material consisting of A+B+C+D.

3. A thermoplastic molding material as claimed in claim 1, wherein the thermoplastic resin (A) employed is a styrene homopolymer or copolymer which may or may not furthermore contain an elastomer component having a glass transition temperature $T_g < 0°$ C.

4. A molding material as claimed in claim 3, wherein the thermoplastic resin used is a styrene copolymer consisting of from 50 to 99% by weight of styrene, or of styrene which is alkylated in the nucleus, or of a mixture of these, and from 1 to 50% by weight of acrylonitrile.

5. A thermoplastic molding material as claimed in claim 1, wherein the thermoplastic resin (A) used is a styrene homopolymer or copolymer which contains an elastomer component having a glass transition temperature $T_g < 0°$ C, this elastomer component being employed in the form of a graft copolymer of the monomers constituting the component A.

6. A molding material as claimed in claim 4, wherein the styrene copolymer contains, as copolymerized units, from 50 to 95% by weight of styrene or of a styrene which is alkylated in the nucleus, or of a mixture of these, and from 1 to 50% by weight of acrylonitrile, and furthermore consists of from 5 to 50% by weight, based on the component A, of a graft copolymer consisting of from 10 to 50% by weight of a grafted shell and from 50 to 90% by weight of an elastomeric grafting base.

7. A thermoplastic molding material as claimed in claim 1, wherein component (B) employed is a phenol-/aldehyde resin which consists of
   (b$_1$) one or more aldehydes of the formula (I)

$$R^1\text{-CHO} \quad (I)$$

where $R^1$ is H, $C_1$–$C_{10}$-alkyl, cycloalkyl, $C_6$–$C_{12}$-aryl or -aryl-$C_1$–$C_3$-alkyl, and
   (b$_2$) one or more phenols of the formula (II)

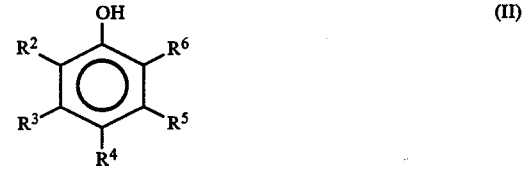

where $R^2$ and $R^6$ are each hydrogen, and $R^3$, $R^4$ and $R^5$ can each alternatively be hydrogen, $C_1$–$C_{20}$-alkyl, cycloalkyl, $C_6$–$C_{10}$-aryl, $C_1$–$C_6$-alkoxy, cycloalkoxy, $C_6$–$C_{10}$-phenoxy, hydroxyl, carbonyl, carboxyl, cyano, a $C_1$–$C_6$-alkyl ester radical, a $C_6$–$C_{10}$-aryl ester radical, sulfo, sulfonamido, a sulfonic acid $C_1$–$C_6$-alkyl ester radical, a sulfonic acid $C_6$–$C_{10}$-aryl ester radical, a $C_1$–$C_6$-alkyl- or $C_6$–$C_{10}$-arylphosphonic acid radical or its $C_1$–$C_6$-alkyl or $C_6$–$C_{10}$-aryl ester radical, a phosphonic acid radical or its mono- or di-$C_1$–$C_6$-alkyl or $C_6$–$C_{10}$-aryl ester, an 0-phosphoric acid radical or its mono- or di-$C_1$–$C_6$-alkyl or $C_6$–$C_{10}$-aryl ester, or -aryl-$C_1$–$C_6$-alkyl, or $R^2$ and $R^4$ are each hydrogen, and $R^3$, $R^5$ and $R^6$ can have the above meanings.

8. A thermoplastic molding material as claimed in claim 4, wherein the phenol/aldehyde resin (B) used consists of formaldehyde and phenol or a monosubstituted or polysubstituted alkylphenol where alkyl is of 2 to 8 carbon atoms, or a mixture of these, and has a number average molecular weight of from 500 to 2,000.

9. A molding material as claimed in claim 6, wherein a triazine derivative is employed.

10. A thermoplastic molding material as claimed in claim 8, wherein a cyclic or dicyclic phosphite, a phosphonate, a phosphate, a hypophosphite or a hypodiphosphate is used.

* * * * *